United States Patent [19]
Marcovitch

[11] 3,756,055
[45] Sept. 4, 1973

[54] APPARATUS FOR ROLLING WORKPIECES

[75] Inventor: Jacob Marcovitch, Braamfontein, South Africa

[73] Assignee: Rotary Profile Anstalt, Vaduz, Liechtenstein

[22] Filed: Sept. 29, 1971

[21] Appl. No.: 184,829

Related U.S. Application Data

[63] Continuation of Ser. No. 2,063, Jan. 12, 1970, abandoned.

[30] Foreign Application Priority Data
Dec. 15, 1969  South Africa.................... 69/8679

[52] U.S. Cl.................... 72/71, 72/121, 72/204, 72/327
[51] Int. Cl................................. B21b, B21d 3/02
[58] Field of Search .............. 72/71, 70, 204, 327, 72/121

[56] References Cited
UNITED STATES PATENTS
2,342,917   2/1944   Brown.................................. 72/71
3,422,655   1/1969   Stone................................... 72/243
1,367,299   2/1921   Canda................................... 72/71
3,466,910   9/1969   Carlsen................................. 72/71

Primary Examiner—Charles W. Lanham
Assistant Examiner—Robert M. Rogers
Attorney—Young & Thompson

[57] ABSTRACT

This invention provides in or for apparatus for parting cylindricoidal workpieces by rolling, a plurality of cutting rollers arranged on coincident axes and stop means which are arranged to contact the ends of a workpiece when the cutting rollers engage the surface of the workpiece to prevent the workpiece spreading axially during the cutting operation. The apparatus preferably further comprises means for rotating the cutting rollers and the workpiece and means for so moving the workpiece and the cutting rollers so that their axes approach at high speeds.

5 Claims, 3 Drawing Figures

Patented Sept. 4, 1973
3,756,055
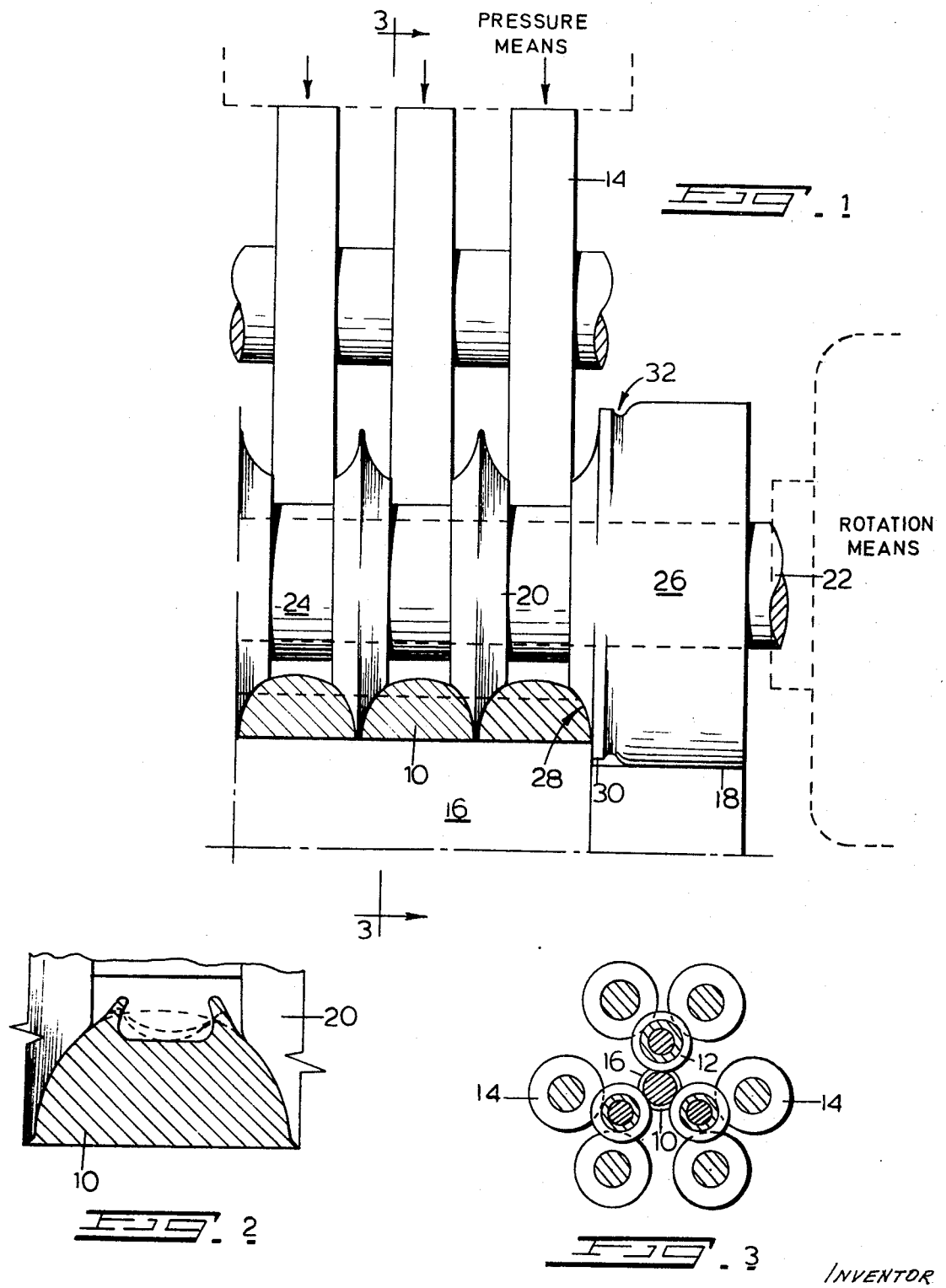

APPARATUS FOR ROLLING WORKPIECES

This is a continuation, of application Ser. No. 2,063, filed Jan. 12, 1970.

This invention relates to apparatus for rolling workpieces.

According to one aspect of this invention there is provided in or for apparatus for parting cylindroidal workpieces by rolling, a plurality of cutting rollers arranged on coincident axes and stop means which are arranged to contact the ends of a workpiece when the cutting rollers engage the surface of the workpiece to prevent the workpiece spreading axially during the cutting operation. The apparatus preferably further comprises means for rotating the cutting rollers and the workpiece and means for so moving the workpiece and the cutting rollers so that their axes approach at high speeds.

The apparatus may be used for cutting bars and tubes and is particulary useful for partings rings such as bearing cups from lengths of tube.

An embodiment of the invention will now be described with reference to the accompanying drawings.

In the drawings:

FIG. 1 is a section through a part of cutting apparatus of the invention,

FIG. 2 is an enlargement of a detail of FIG. 1, and

FIG. 3 is a section to a smaller scale through the entire apparatus of FIG. 1, the section being taken on line 3—3 of FIG. 1.

Referring now to FIGS. 1 and 3 there is shown apparatus for parting rings from a tube 10 the initial outside surface which is indicated in dotted lines in FIG. 1. The apparatus comprises three profile cutters 12 arranged equiangularly about the tube and which may be of up to six times the diameter of the tube 10. Each profile cutter 12 is backed up by a pair of massive back-up rollers 14 which are movable inwardly to move the profile cutters 12 towards the tube 10.

The tube 10 is mounted on a mandrel 16. The mandrel 16 is stepped down at its ends at 18 for the purpose to be described.

Each profile cutter 10 comprises a plurality of identical cutting rollers 20 arranged on a shaft 22 and being spaced apart by identical collars 24. Also mounted on the shaft 22 are a pair of end stops 26 (only one shown) spaced from the outer cutting rollers 20 by collars 24.

Each cutting roller 20 has a double converging profile as shown. The end stop 26 has its inside face 28 shaped to correspond with half the cutting profile. At the largest diameter of the face 28 there is formed, as it were as a continuation a flange 30 which has a diameter slightly greater than the cutting profile. Slightly behind the flange 30 the end stop 26 is relieved at 32. The end stop is a considerable strength and is securely fixed on the shaft 22 in such a way that it, the end stop, is not movable relative to the other end stop (not shown).

The stepped down portion 18 of the mandrel 16 corresponds to the difference between the diameters of the cutting profile and the end stop 26. The tube 10 is accurately located on the mandrel 16.

In use the profile cutters 10 are moved in on to the tube at a high feed. Simultaneously as the cutting rollers 20 engage the tube the end stops 26 engage the ends of the tube 10.

As the cutting rollers 20 displace the material of the workpiece, the workpiece 10 is prevented from expanding axially by the end stops 26, the material displaced will move up into the spaces between the cutting rollers 20. In order that this material will form an acceptable continuation of the outer wall of the parted material it is necessary for the profile cutters to be fed in at a very high rate. Typically for a mild steel tube of ¼ inch wall thickness the feed must be of the order of 4 seconds per inch. If the feed is too slow the material will "fin" as shown in FIG. 2 in full lines and the faster the in feed rate the nearer will the surface of the displaced material approach the desired configuration. (see the dotted lines in FIG. 2).

Parting will be complete when the edges of the cutting rollers approach the surface of the mandrel. An excess material at the end face of the workpiece may be accommodated in the relieving channel 32.

In another embodiment the mandrel is not stepped down but the extended portion is left the same diameter throughout and sleeve type pressurized ends stops which fit over the extended mandrel ends apply the necessary axial pressure on the workpiece ends and rotate in unison with it, to prevent its axial spread.

The sleeve ends may be contoured to shape the tube ends and they may also act as stops on their outside diameters bearing against plain cylindrical rollers carried on the shaft to each side of the cutters to limit the inward travel of the cutters.

With the apparatus as described above long lengths of tube may be parted into numbers of rings at very high speeds.

If however the lengths of tubing being parted are not so long, the profile cutters need not be backed up. As a broad general indication, if the length of the tube is less than two times the length of the diameter of the shaft, then the profile cutter need not necessarily be backed up and can be supported by the shaft being mounted in bearings. The invention is not limited to the precise constructional details hereinbefore described and illustrated in the drawings.

I claim:

1. Apparatus for parting a plurality of substantially identical rings from a tubular workpiece by rolling, comprising a plurlaity of equally axially spaced cutting rollers arranged on coincident axes, stop means between which said plurality of cutting rollers is disposed and which contact both ends of a workpiece when the cutting rollers engage the surface of the workpiece to prevent the workpiece spreading axially during the cutting operation, means for rotating the cutting rollers and the workpiece, and means for imparting relative motion to the workpiece and the cutting rollers so that their axes approach at high speed thereby simultaneously to cut said tubular workpiece into a plurality of substantially identical rings.

2. Apparatus as claimed in claim 1, further comprising backing means on which the cutting rollers roll in line contact.

3. Apparatus as claimed in claim 2 in which the backing means are rollers.

4. Apparatus as claimed in claim 1 in which the cutting rollers are mounted respectively in aligned sets on a plurality of shafts.

5. Apparatus as claimed in claim 1 in which the cutting rollers have cutting profiles at their edges and in which the stop means has a profile similar to half of the cutting profile.

* * * * *